United States Patent
Zhu et al.

(10) Patent No.: US 6,847,459 B2
(45) Date of Patent: Jan. 25, 2005

(54) METHOD AND APPARATUS FOR DYNAMICALLY MEASURING THE FULL FLYING STATE OF A SLIDER

(75) Inventors: Yaolong Zhu, Bukit Batok Central (SG); Bo Liu, Pandan Gardens (SG)

(73) Assignee: Data Storage Institute (SG)

( * ) Notice: Subject to any disclaimer, the term of this patent is extended or adjusted under 35 U.S.C. 154(b) by 408 days.

(21) Appl. No.: 09/922,987

(22) Filed: Aug. 3, 2001

(65) Prior Publication Data

US 2002/0080518 A1 Jun. 27, 2002

(30) Foreign Application Priority Data

Aug. 3, 2000 (SG) ..................................... 200004355-4

(51) Int. Cl.$^7$ ................................................. G01B 9/02
(52) U.S. Cl. ..................................................... 356/507
(58) Field of Search ................................ 356/507, 405, 356/492, 482

(56) References Cited

U.S. PATENT DOCUMENTS 5,218,424 A * 6/1993 Sommargren ............... 359/492
5,475,488 A 12/1995 Fukuzawa et al.
5,502,565 A * 3/1996 Fukuzawa et al. .......... 356/507
5,675,463 A 10/1997 Li
6,151,185 A 11/2000 Ishizuka et al.
6,493,170 B1 12/2002 Kato et al.

OTHER PUBLICATIONS

Australian Patent Office Written Opinion, dated Jan. 30, 2003.
Australian Patent Office Search Report, dated Jan. 30, 2003.

\* cited by examiner

Primary Examiner—Gregory J. Toatley, Jr.
Assistant Examiner—Patrick Connolly
(74) Attorney, Agent, or Firm—Jenkens & Gilchrist PC

(57) ABSTRACT

A method for dynamically measuring the spatial position and orientation of a slider used in a magnetic disk drive operates by directing one or more beams of light through a microscope to an interface between the slider and the magnetic disk. The light beam reflected from the slider-disk interface is used to derive the spacing between the surface of the disk and the multiple points on the slider so that the spatial position of the slider can be determined. The number of measured points on the slider is at least equal to the number of degrees of freedom of the slider so that the spatial position of the slider can be fully determined.

23 Claims, 10 Drawing Sheets

METHOD AND APPARATUS FOR DYNAMICALLY MEASURING THE FULL FLYING STATE OF A SLIDER

FIELD OF THE INVENTION

The invention relates to the measurement of the spatial position and orientation of a recording head slider with respect to an adjacent disk surface. The invention is particularly applicable to magnetic disk drives, for example for communicating the flying state of magnetic recording head sliders or specific parameters for the slider such as dynamic flying height, pitch angle and roll-angle.

BACKGROUND OF THE INVENTION

The magnetic disk and head are key components of magnetic disk drives. When the disk drive is in operation, the magnetic disk rotates at speed, and the magnetic head slider is positioned a small distance above the magnetic disk due to the well known "air bearing" effect.

The distance between the slider and the surface of the magnetic disk ("head-disk spacing") is a critical parameter relating to the recording density and reliability of the disk drive. A reduction in the head-disk spacing can be used to achieve an increase in recording density.

In the currently existing drives, the head-disk spacing is around 15 to 30 nanometers (nm). It is expected that head-disk spacing will fall far below 10 nm levels in due course. Accordingly, the measurement of slider position relative to the surface of a magnetic disk is becoming increasingly important for achieving design targets while ensuring product quality.

At present, optical techniques exist to test the flying height of a magnetic head slider before its installation in a magnetic drive. These techniques are generally recognised as unsatisfactory as the accuracy and data repeatability in measurement become more critical when technology moves to deep sub-10 nm head disk spacing. Furthermore, the three dimensional stability of a slider's position and orientation is becoming crucially important in sub-10 nm spaced head-disk systems, and the currently existing optical techniques cannot provide a direct measurement of the stability.

Accordingly, it is an object of the invention to address these and other problems associated with existing techniques by providing an improved method for measurement of the spatial position and orientation of a recording head slider with respect to an adjacent disk surface.

SUMMARY OF THE INVENTION

The inventive concept resides in a recognition that the spatial position and orientation of a slider relative to the surface of a magnetic disk surface can be dynamically measured by simultaneously measuring a number of parameters associated with one or more light beams reflected from the slider surface.

The invention provides a method of dynamically determining the spatial position and orientation of a slider positioned above a transparent disk surface, the method including directing one or more incident beams of light to an interface between the slider and the disk, simultaneously measuring values of light properties of one or more beams of light reflected from said slider-disk interface, said simultaneously measured values respectively corresponding with multiple points on the surface of the slider which are spaced apart from each other, and calculating the spatial orientation of the slider based on said simultaneously measured values.

Preferably, the number of said multiple points is equal to or greater than the number of degrees of freedom said slider has in its movement above the transparent disk. Preferably, said number of degrees of freedom and said number of multiple values are both equal to three.

Preferably, the spatial position and orientation of the slider is characterized in terms of three parameters—namely the spacing between the slider and the disk surface, a pitch angle and a roll angle of the slider in respect to the disk surface.

Preferably, the determination of the spatial orientation of the slider involves a determination of the spacing between the surface of the transparent disk and respective spaced points on said slider.

In one embodiment, a single beam of light having multiple discrete or non-discrete wavelengths is used. Preferably, in this first embodiment, a light source having multiple frequencies is directed to the slider-disk interface. The measurement of multiple parameters preferably involves the measurement of the intensity of each of the selected frequency components of the light beam after it has been reflected from different points on the surface of the slider.

Preferably, the light reflected from different points is measured using a light beam having a width sufficient to encompass those different points. Preferably, an series of mirrors having suitably located pinholes corresponding with those different points is used.

In a second embodiment, different beams are used to independently monitor different points. Preferably, the beams are incident to the slider at an incident angle off normal.

DESCRIPTION OF EMBODIMENTS

Figure 1B:
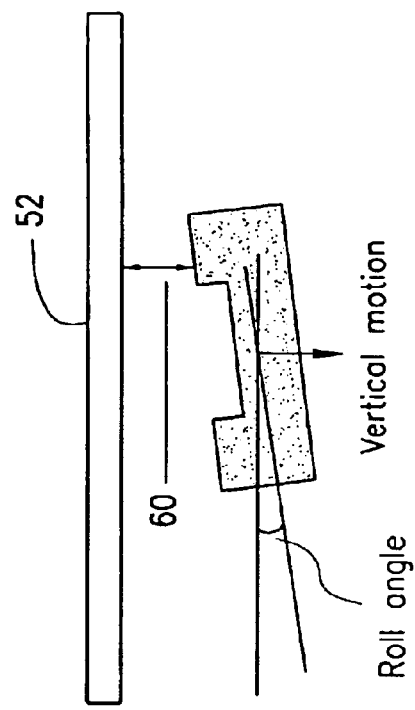
FIGS. 1a & 1b are a schematic drawing in side elevation of a slider/disk interface.
Figure 1A:
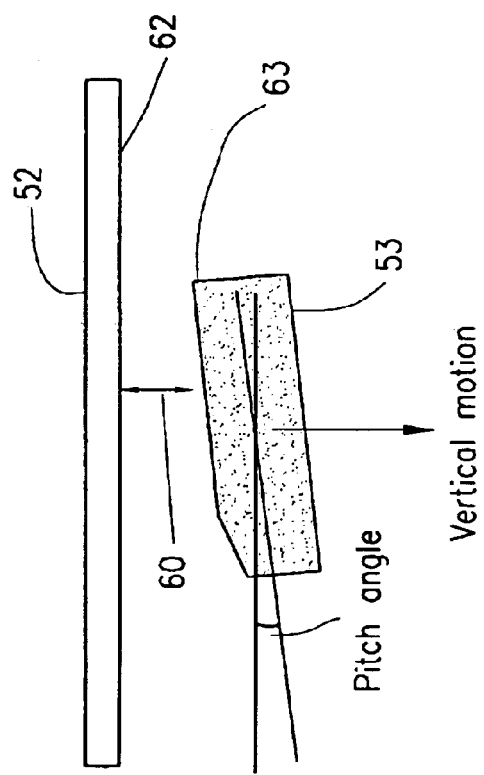

FIGS. 1a and 1b show a typical orientation of a slider 53 with respect to a magnetic disk 52. The disk 52 is installed on a spindle (not shown) and rotates with the spindle. The slider 53 is positioned a small distance from the disk 52 by virtue of the air bearing effect as the disk 52 rotates. The slider 53 has an air bearing surface 63 facing the disk 52. The disk 52 is transparent and preferably glass so that the slider-disk interface is accessible by light beams.

The spacing 60 between the air bearing surface 63 and the disk surface 62 is referred to as the slider-disk spacing, or the "flying height" of the slider 53. The slider 53 is able to move in three degrees of freedom which are most conveniently described in terms of vertical height, pitch angle and roll angle. The spatial position and orientation or "full flying state" of the slider 53 in relation to the disk 52 can be defined by these three parameters.

Figure 2:
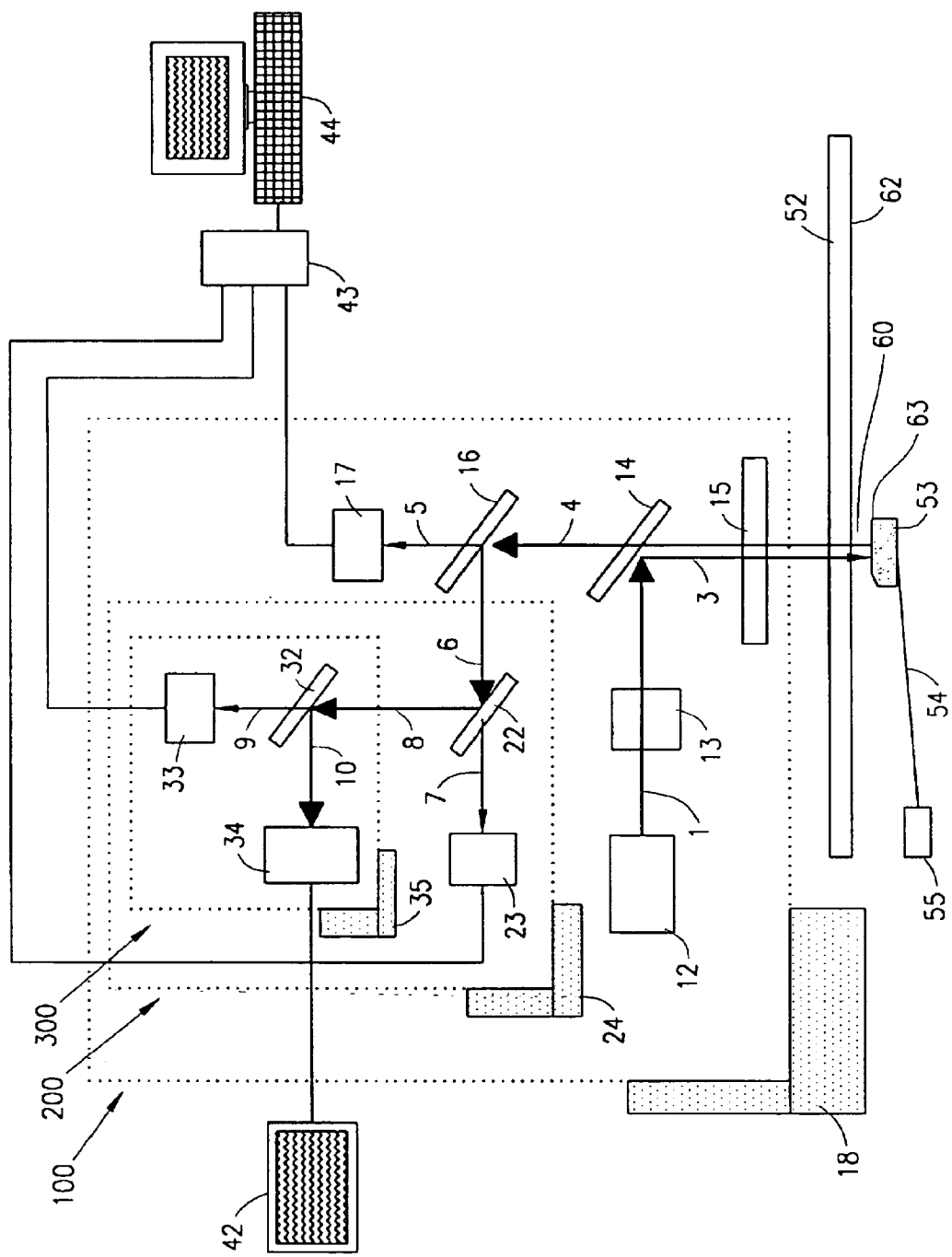
FIG. 2 is a schematic drawing representing a measuring apparatus for dynamically measuring the spatial position and orientation, i.e. the full flying state, of a slider in relation to a surface of a glass disk, according to a first embodiment of the invention.

FIG. 2 shows an apparatus for dynamically measuring the spatial orientation of a slider 53. A light source 12 produces a light beam 1 consisting of multiple discrete wavelengths of light. The light source 12 can be, for example, a Xenon lamp, one or more laser diodes, or a mercury arc lamp. When it is incident on the slider 53, the light beam 1 is sufficiently wide to cover a region of air bearing surface 63 containing a number of selected measurement points, as further discussed below.

Accordingly, the reflected light beam 4 contains enough information to determine the spatial position and orientation of the slider 53. Information is derived in relation to the distance between the disk 52 and three discrete spaced points on the air bearing surface 63 of the slider 53, and a determination is consequently made as to the spatial orientation of the slider 53 with respect to the disk 52.

A series of three distinct stages of optical componentry is used to measure the reflected light intensities associated with three discrete spaced points on the air bearing surface 63.

In a first stage, light output as beam 1 from the light source 12 passes through collimating optics 13, after which it is incident on a beamsplitter 14. The beamsplitter 14 directs the beam 1 to a region at the interface of the slider 53 and the disk 52 via a microscope objective lens 15. Beam passes through disk 52, which is transparent, and is reflected as beam 4 from air bearing surface 63.

Reflected light 4 from the head-disk interface enters a mirror 16 having a pinhole in its surface. A portion of beam 4 passes as light beam 5 through the pinhole to a first detector component 17 which converts the intensity profile of the light beam 5 into corresponding electrical signals inputed to an analog-to-digital converter 43 connected to a computer 44. The recorded values are sampled and stored in the computer 44.

In a second stage, light beam 6 reflected from mirror 16 is directed to a mirror 22 having a pinhole. Light beam 7, which passes through the pinhole in the mirror 22, is directed to a second detector component 23 similar to detector component 17. The detector 23 records the intensity of light beam 7 and inputs corresponding electrical signals to A/D converter 43. Again, the recorded values are sampled and stored in the computer 44.

In a third stage, light beam 8 reflected from the mirror 22 is directed to mirror 32 also having a pinhole. A transmitted light beam 9 is directed to a third detector component 33 similar to both the first and second detectors 17 and 23. As with the first and second stages, light intensity is recorded by the detector 33, and is ultimately read by the computer 44 as with detectors 17 and 23.

The pinholes in the first, second and third mirrors 16, 22 and 32 respectively correspond with three distinct and spaced measurement points on the air bearing surface 63 of the slider 53. The cascaded series of mirrors is used to independently access (using the respective pinholes) light reflected from each of the three selected testing points on the air bearing surface 63 of the slider 53. The detectors 17, 23, 33 are used to measure light reflected from these three respective points.

Light beam 10 reflected from mirror 32 is passed to a CCD camera 34 which is connected to a video display 42. This provides a visual indication of the slider which can be viewed by an operator.

Figure 3:
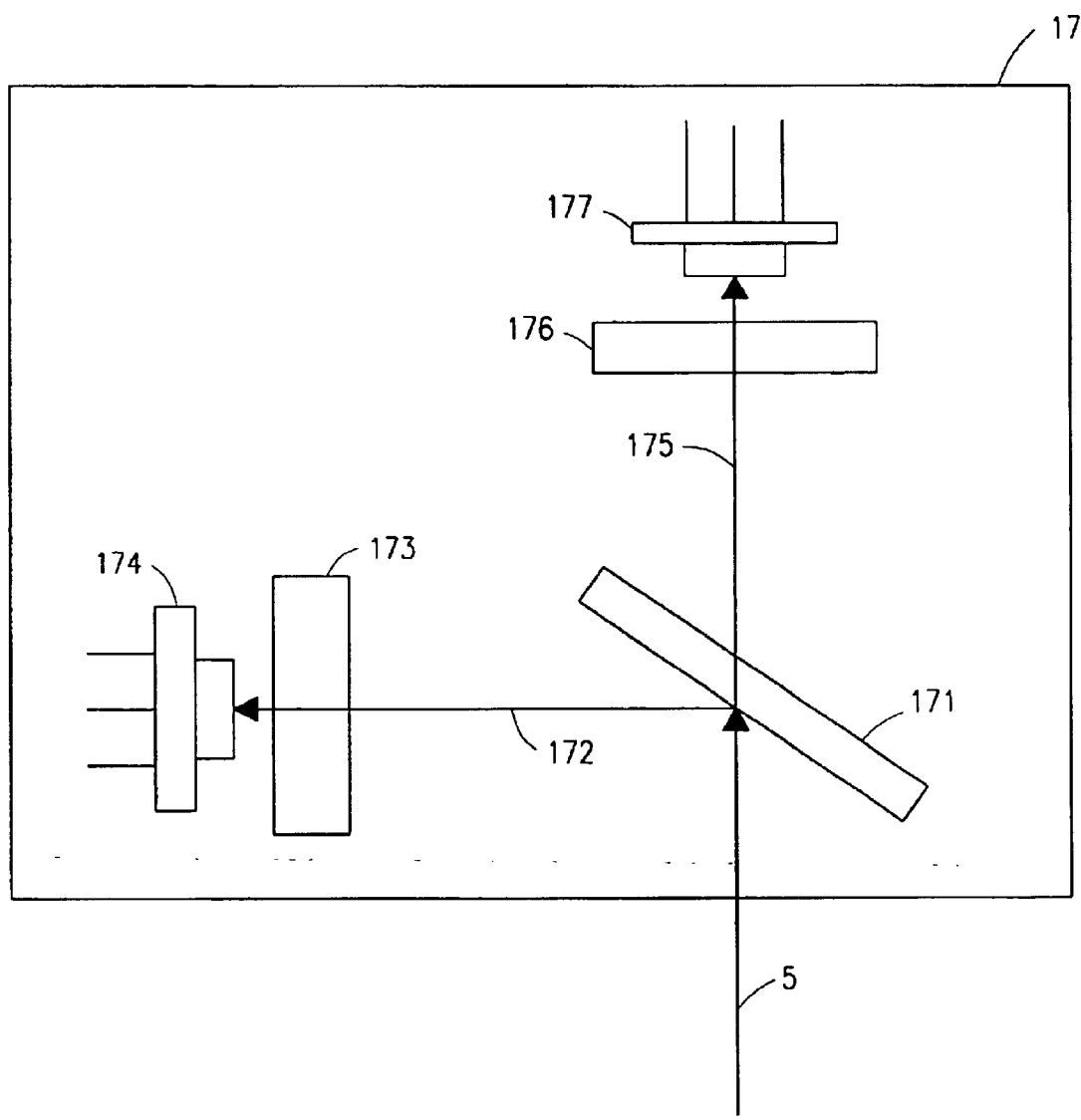
FIG. 3 is a schematic drawing of a detector used in the embodiment shown in FIG. 2.

FIG. 3 shows an example of the components of the first detector 17. The detector is structured to allow a determination of the intensities of two wavelengths included in the light beam 5 passed to the detector 17. The second and third detectors 23 and 33 have the same configuration and function in the same manner as the first detector 17.

A beamsplitter 171 reflects light beam 172 of one wavelength, which is preferably 436 nm, towards a 436 nm interference filter 173 and then to photodetector 174. The beamsplitter 171 preferably has a coating layer of 85% to 95% reflectance at 436 nm and 85% to 95% transmittance at 580 nm. A 580 nm light beam 175 passing through the beamsplitter 171 traverses a 580 nm interference filter 176 and enters photodetector 177. A separate signal is generated for each wavelength, and each signal generated by the photodetectors 174 and 177 is connected to the analog-to-digital converter 43. Accordingly, a digital measurement of the light intensities of the two wavelengths is made for use by the computer 44 as later described.

Wavelengths 436 nm and 580 nm are conveniently used as they are two of the peaks lines of emission of the mercury arc lamp. Alternatively, other wavelengths can equally well be used, such as 404 nm and 546 nm which are other peak lines of the mercury arc lamp.

Once the two light intensities are measured, the flying height can be measured, as now explained. According to the optical thin film theory, the intensity I of the reflected fringe pattern is $$I = \frac{r_1^2 + r_2^2 + 2r_1 r_2 \cos\delta}{1 + r_1^2 r_2^2 + 2r_1 r_2 \cos\delta}$$

where, $r_1$ is the reflectance of the disk surface 62 of the disk 52;

$r_2$ is the reflectance of the air-bearing surface 63 of the slider 53;

$\delta$ is the phase difference corresponding to the light path difference between successive transmitted light waves. The phase difference $\delta$ is:

$$\delta = \frac{4\pi n h \cos\theta_1'}{\lambda} - \phi$$

where, $\lambda$, is the wavelength of the light;

n is the refractive index of the medium between the disk surface 62 and air-bearing surface 63, nominally the medium is air; and $\theta_1'$ is the angle of incidence of the light wave onto the air-bearing surface 63;

$\phi$ is phase shift on reflection from surface 63, which is dependent on the refractive index of air-bearing surface 63.

Figure 10:
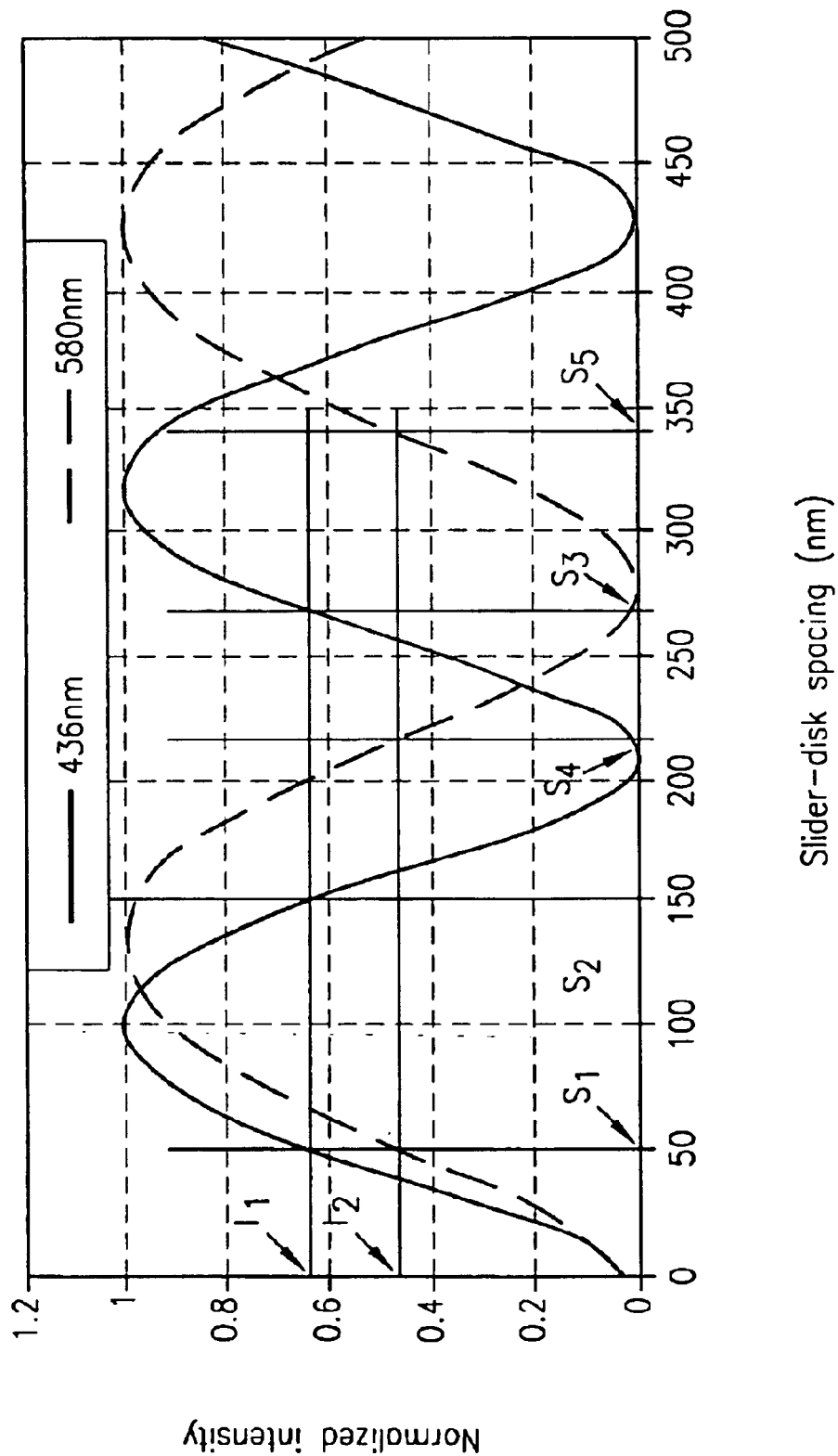
FIG. 10 is a graph representing the typical relationship between intensity of a reflected fringe pattern and flying height.

FIG. 10 shows the typical relationship between the intensity of the resultant fringe pattern as the flying height is varied between zero and 500 nm. The parameters are as follows: A is 436 and 580 nm respectively; the refractive index of the disk surface 62, air and air-bearing surface 63 are 1.52, 1.0, and 2.15+j*0.5, respectively, and $\theta_1'$ is zero degrees. The light intensity is normalized by the $(I-I_{min})/(I_{max}-I_{min})$, where $I_{max}$ is a maximum of the light intensity, $I_{min}$ is a minimum of the light intensity.

According to the above expression, the intensity of reflected light is dependent on the following parameters; wavelength λ of the incident light; the incident angle; the refraction coefficients of the disk 52, the air medium and the air-bearing surface 63; and slider-disk spacing. All parameters are known except the slider-disk spacing. Thus, if the measured light intensities are determined, the slider-disk spacing can accordingly be calculated.

With reference to FIG. 10, if the measured light intensity is around $I_1$ for 436 nm wavelength, the slider-disk spacing will be near $s_1$, or $s_2$ or $s_3$. However, of the intensity of light with 580 nm wavelength is $1_2$, the possible slider-disk spacings are $s_1$, or $S_4$, or $s_5$. Accordingly it is deduced that the correct slider-disk spacing is $s_1$.

Figure 4:
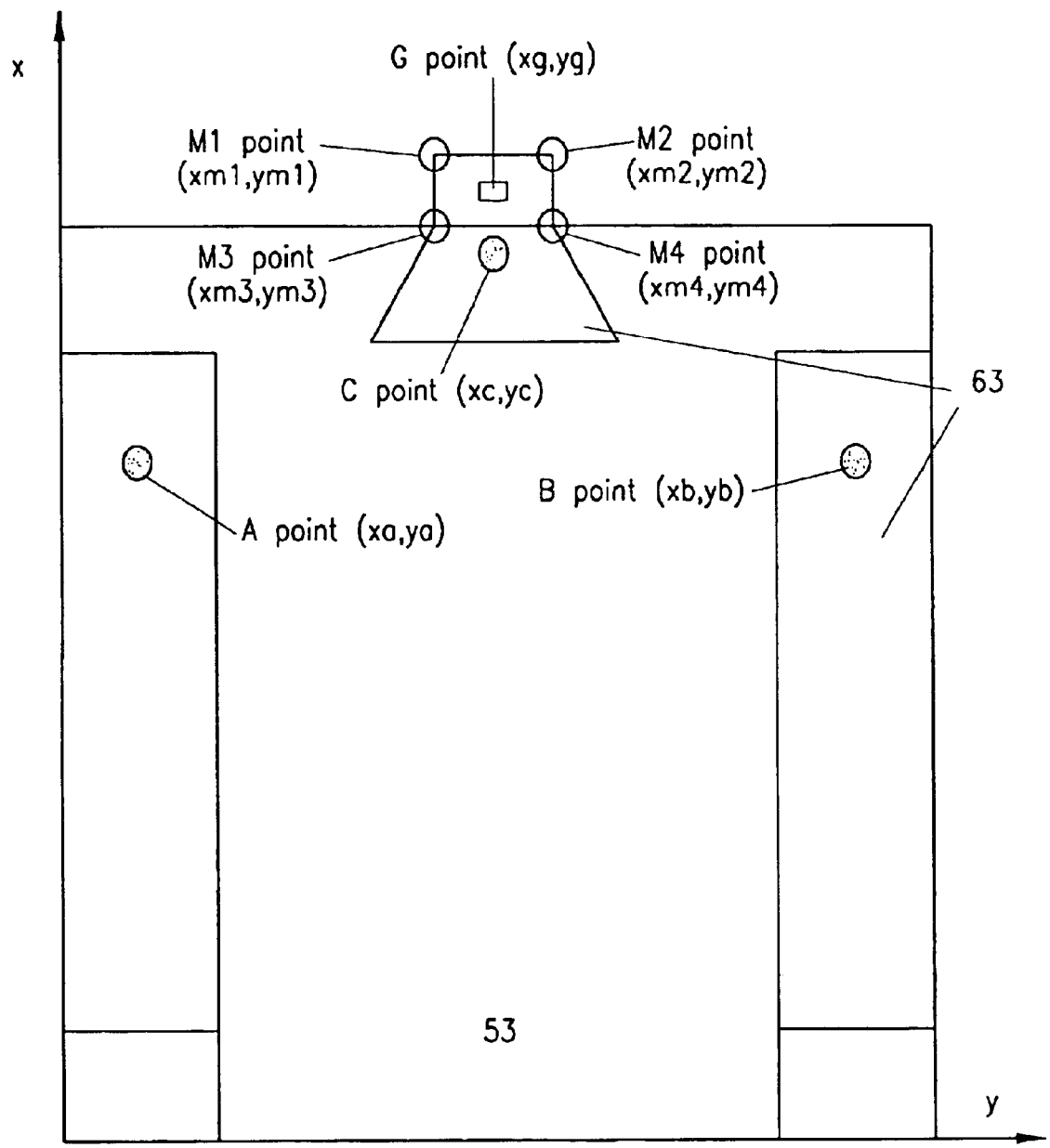
FIG. 4 is a representation of a slider in plain view, with three measurement points indicated on the slider.

FIG. 4 shows the slider 53, and various points on the surface of the slider 53. As an example, the distance from the surface of the disk 52 to points A $(x_a, x_b)$, B $(y_a, y_b)$ and C $(z_c, z_c)$ can be directly measured using the apparatus described above, and the readings from these three measurements can be used to dynamically determine the spatial orientation of the slider 53.

Direct measurement of the pole tip G $(x_g, y_g)$ of the slider 53 is difficult, due to the variation in material and optical constants in this region of the slider 53, compared with the body of the slider 53. Also, the flying height of the corner points M1, M2, M3, M4 is very difficult to measure directly. The method of calculating the flying height of these points, and the pitch angle and roll angle of the slider 53 is described as follows:

Instead, points A, B and C are suitably chosen as reference points. Once the relative intensities of the discrete wavelengths of the reflected beam is measured, the flying height of each of these points can be determined. This is achieved using the same technique as described above.

Figure 5:
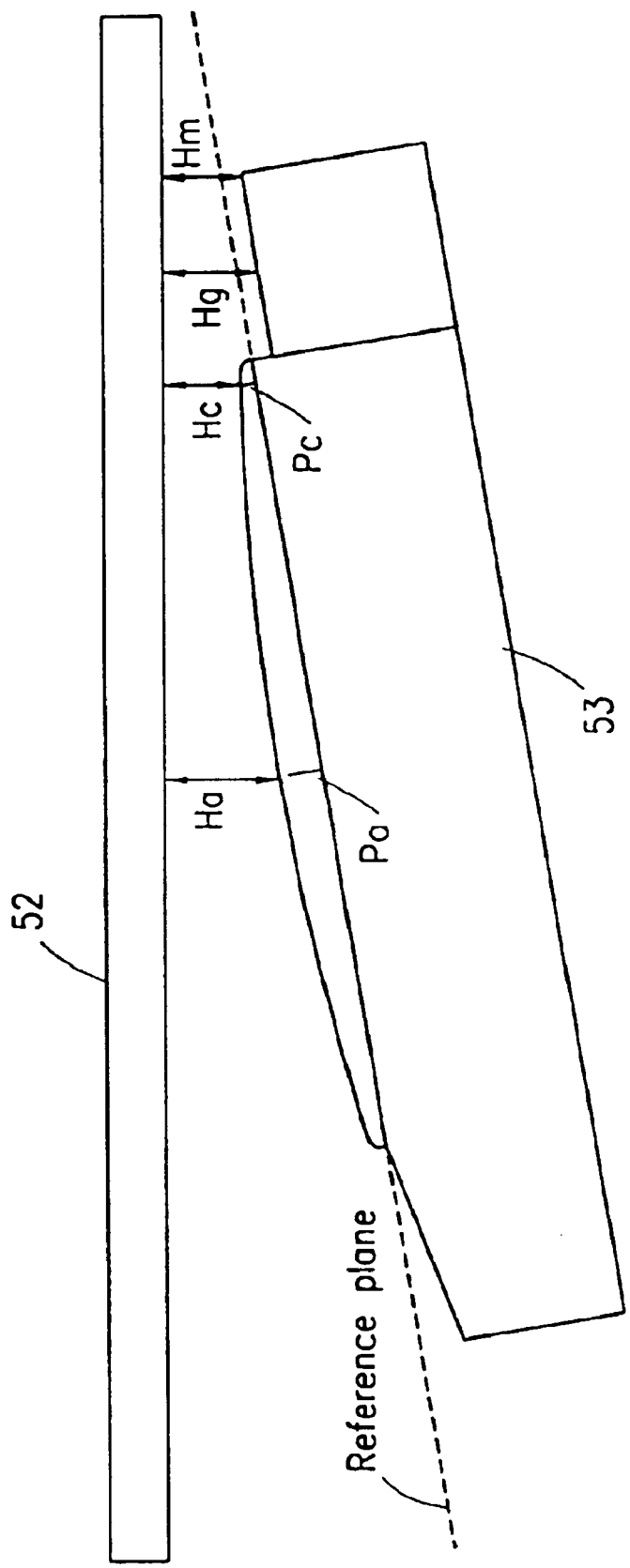
FIG. 5 is a schematic drawing of a recording head flying a small distance from a magnetic disk, with various parameters indicated.

FIG. 5 shows a profile of the slider 53. The flying heights of reference points A, B and C above the surface of the magnetic disk 52 are denoted $H_a$, $H_b$ and $H_c$ respectively. Also, points A, B and C are attributed planar coordinates (A $(x_a, y_a)$, B $(x_b, y_b)$ and C $(x_c, y_c)$) in a plane parallel with the surface of the magnetic disk 52.

With this reference, the position of points A, B and C are for convenience chosen so that:

$$y_c = \frac{y_a + y_b}{2}$$

Since pitch angle (designated a) and roll angle (designated β) are both less than 0.001 radians, cos(a) very closely approximates to 1. This approximation simplifies the calculation of the pitch angle a and roll angle β using the equations directly below.

$$\alpha = \tan^{-1}\left(\frac{H_a + H_b + P_a + P_b - 2H_c - 2P_c}{2 \cdot (x_c - x_a)}\right)$$

$$\beta = \tan^{-1}\left(\frac{H_b + P_b - H_a - P_a}{y_b - y_a}\right)$$

The minimum flying height of the slider ($H_{min}$) can be determined using any appropriate algorithmic technique once the values of each of the respective heights are determined.

$$H_{min} = \min(H_{m1}, H_{m2}, H_{m3}, H_{m4})$$

$$H_{m1} = H_c - \alpha \cdot (X_{m1} - X_c) - \beta \cdot (y_{m1} - y_c) + P_c - P_{m1}$$

$$H_{m2} = H_c - \alpha \cdot (X_{m2} - X_c) - \beta \cdot (y_{m2} - y_c) + P_c - P_{m2}$$

$$H_{m3} = H_c - \alpha \cdot (X_{m3} - X_c) - \beta \cdot (y_{m3} - y_c) + P_c - P_{m3}$$

$$H_{m4} = H_c - \alpha \cdot (X_{m4} - X_c) - \beta \cdot (y_{m4} - y_c) + P_c - P_{m4}$$

Further, the flying height ($H_g$) of the read/write element can be expressed as follows:

$$H_g = H_c - \alpha \cdot (X_g - X_c) - \beta \cdot (y_g - y_c) + P_c - P_g$$

Of course, different measurement points can be used, and different calculation steps can be performed.

Figure 6:
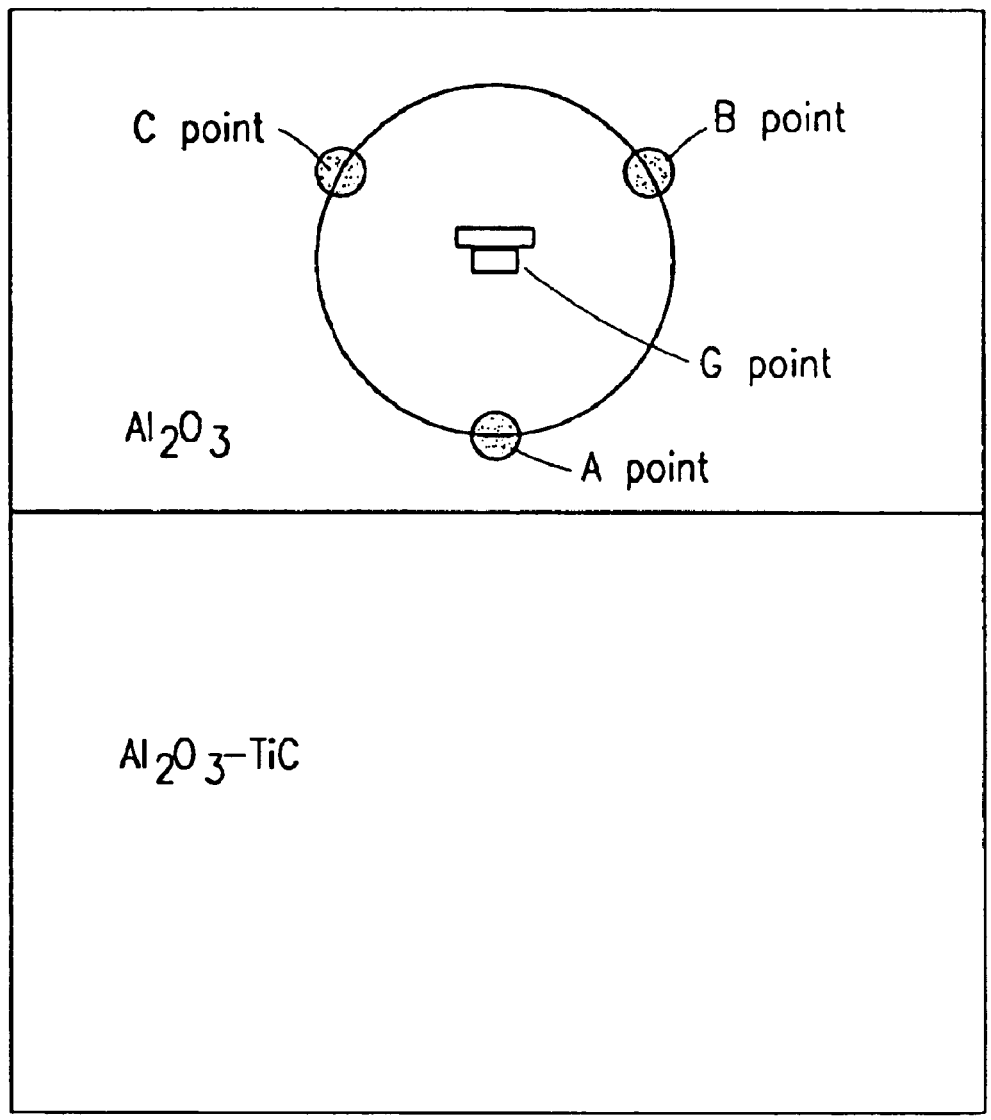
FIG. 6 is a schematic drawing indicating the location of measurement points for measuring the element flying height of a slider at its read/write element.

FIG. 6 shows three points A, B and C arranged around the point G. The flying height of the read/write element G can be calculated from the flying heights at testing points A, B and C by curve fitting methods.

Figure 7:
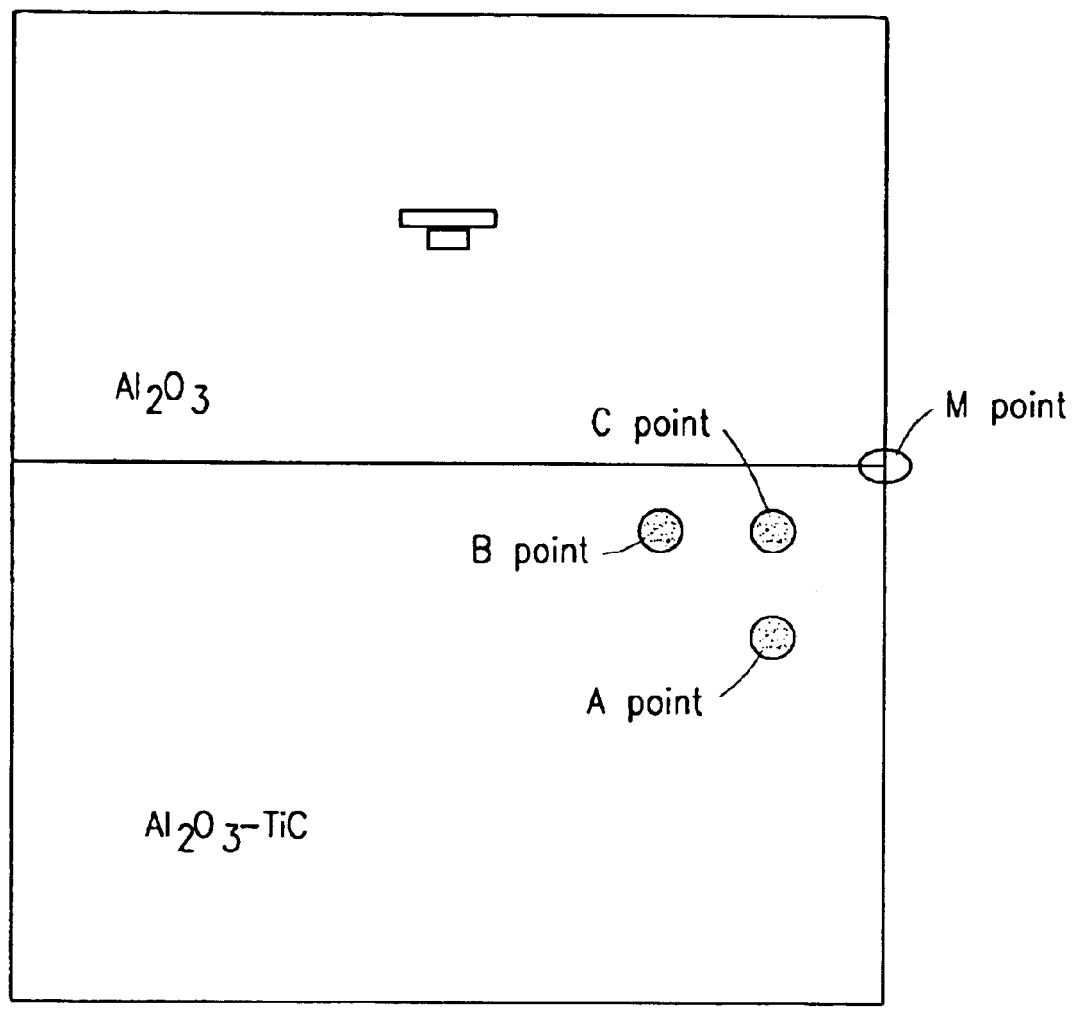
FIG. 7 is a schematic drawing indicating the location of measurement points for measuring the minimum flying height of a slider.

FIG. 7 shows three points A, B and C arranged near a corner point M. The flying height of the point M can be calculated using two-dimensional curve fitting-methods.

Figure 8:
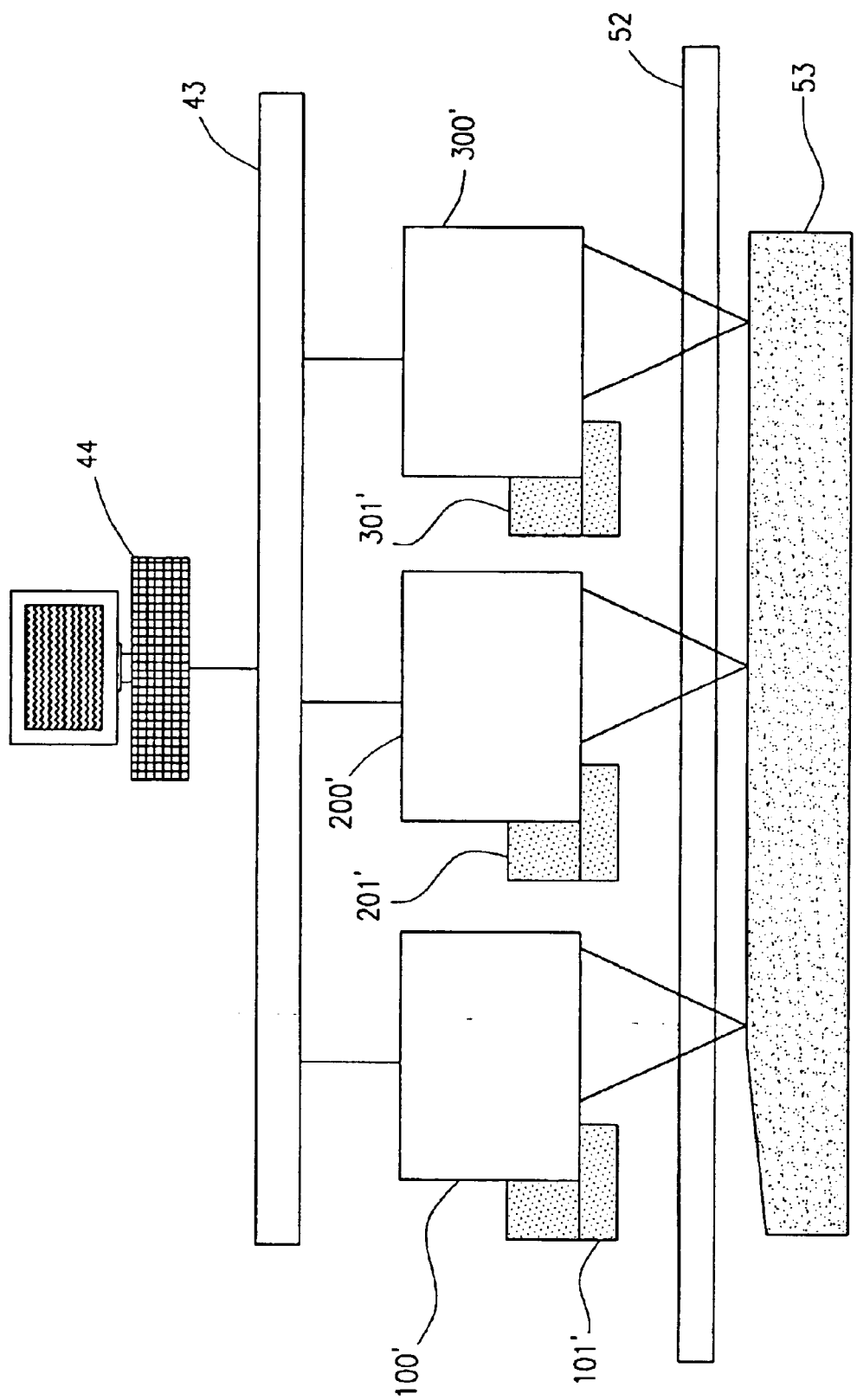
FIG. 8 is a schematic drawing representing a measuring apparatus for dynamically measuring the spatial orientation, i.e. the full flying state, of a slider in relation to a magnetic disk, according to a second embodiment of the invention.

FIG. 8 shows a second embodiment of a system for dynamically measuring the spatial orientation of a slider. Instead of using a series of pinholed mirrors to isolate the light reflected from different points on the air bearing surface 63, three groups of beams and respective detectors are used to independently measure the distance from the magnetic disk 52 to three respective spaced points.

Three optical assemblies 100', 200' and 300' are substantially identical in structure and configuration. Each of the assemblies 100', 200' and 300' can use the same wavelengths and incident angles or different wavelengths and/or incident angles. The different wavelengths and incident angles can be independently chosen.

Position adjustment assemblies 101', 201' and 301' are used to position their respective optical assemblies 100', 200' and 300' so that those optical assemblies are located to measure the height of three suitable respective points A, B and C.

In this way, the spatial orientation of the slider 53 can be measured by the following steps:

(a) selecting the position of points A, B and C on the air bearing surface 63 of the slider 53;

(b) adjusting the assemblies 101', 201', and 301' to position the optical assemblies 100', 200' and 300' so that the flying heights of points A, B and C are measured;

(c) measuring the distance between the disk 52 and the points A, B and C on the air bearing surface 63; and (d) calculating the spatial orientation of the slider 53 based on the measured distances.

The lamp source and detector can be the same as the first embodiment that as illustrated in FIG. 2, though this needs not to be the case.

Figure 9:
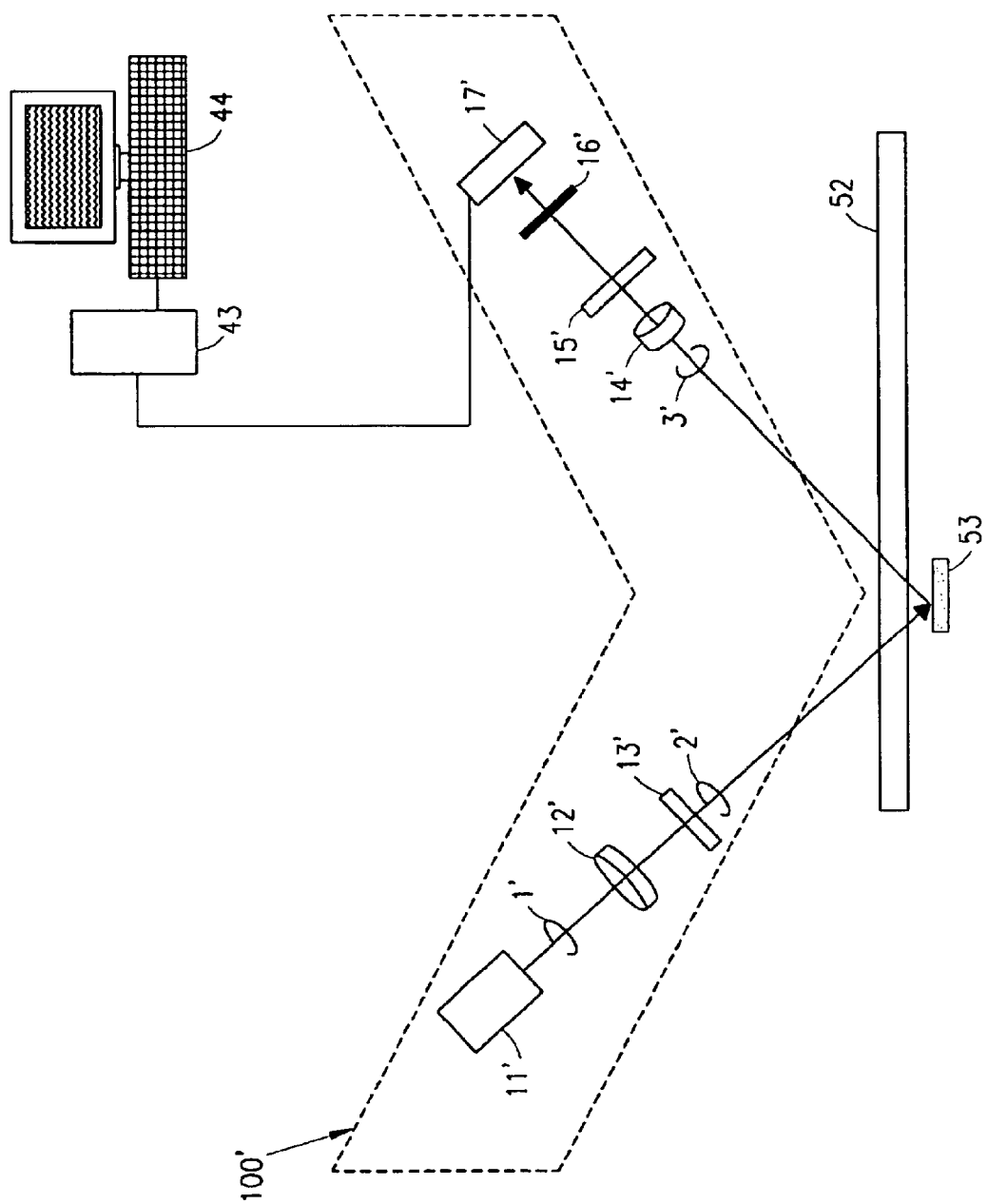
FIG. 9 is a schematic drawing of one of the optical systems of the apparatus depicted in FIG. 8.

FIG. 9 shows an example of the optical assembly 100' indicated in FIG. 8. Optical system 100' includes a light source 11' which provides a light beam 1' having respective non-zero orthogonal polarisation vectors s and p. A focussing lens 12' directs light 1' to a polarising element 13'. The polarisation of the light 1' is adjusted to provide a better signal-to-noise ratio in measured values.

The resulting light 2' is directed to a region between the slider 53 and the disk 52 at an incident angle typically between 0° and 80°.

The reflected light 3' from the head-disk interface passes through a lens 14', and is then directed to phase shift component 15' which adjusts the phase difference of the s- and p-type polarisations in the light 3'.

The light 3' then passes through a filter 16' and enters a detector 17' similar to the detector 17 used in the first embodiment. The detector 17' measures the intensity of light in each polarisation direction as well as the combined intensity. The detected data are recorded in the computer 44 after digitization via the analog-to-digital card 43.

Accordingly, instead of measuring the intensities of two different wavelengths-of-light in one beam, the relative intensities of each orthogonal polarisation can be measured as an alternative method of determining the distance from the magnetic disk 52 to three spaced points A, B and C on the slider 53.

Once the flying height measurement is performed, the spatial orientation or full flying state of the slider 53 can be calculated in a manner similar to that described in the first embodiment.

While specific embodiments of the invention are shown herein, it should be apparent to those skilled in the art that is not so limited, but is susceptible to various changes without departing from the scope of the invention.

What is claimed is:

1. A method of dynamically determining the spatial position and orientation of a slider positioned above a transparent disk, the method comprising the steps of:
    directing one or more incident beams of light to the interface between the slider and the disk;
    simultaneously measuring values derived from one or more beams of light reflected from said slider-disk interface, said simultaneously measured values respectively corresponding with multiple testing points on the surface of the slider which are spaced apart from each other; and
    calculating the spatial orientation of the slider based on said simultaneously measured values.

2. A method as claimed in claim 1, wherein said values are used to derive an indication of the respective spacing between the surface of the transparent disk and each of said multiple testing points on said slider surface.

3. A method as claimed in claim 1, wherein the number of said multiple testing points is equal to or greater than the number of degrees of freedom said slider has in its movement above the transparent disk, so that the spatial orientation of the slider can be fully determined.

4. A method as claimed in claim 3, wherein said number of degrees of freedom, and the number of said multiple values are both equal to three.

5. A method as claimed in claim 1, wherein the spatial orientation of the slider is characterized in terms of (i) a spacing between the slider and the disk surface, (ii) a pitch angle and (iii) a roll angle of the slider with respect to the disk surface.

6. A method as claimed in claim 1, wherein said one or more beams of light each have two or more wavelengths, and said values include the relative intensities of said two or more wavelengths after reflection from the slider-disk interface.

7. A method as claimed in claim 1, wherein said one or more beams of light have two orthogonal vectors of polarisation, and said values include the intensities of the two vectors of polarisation after reflection from the slider-disk interface.

8. A method as claimed in claim 7, wherein said one or more beams of light are incident on said slider-disk interface at an angle substantially between 0° and 80°.

9. A method as claimed in claim 6, wherein said multiple values are simultaneously measured by using a series of cascaded mirrors having pinholes to isolate reflected light respectively corresponding with each of said multiple testing points from one beam of light reflected from the slider-disk interface.

10. A method as claimed in claim 1, wherein said multiple values are simultaneously measured by independently using more than one of said one or more beams of light reflected from said slider-disk interface.

11. A method as claimed in claim 1, wherein the minimum flying height of the slider is determined once the spatial orientation of the slider is determined, and the surface geometry of the slider is known.

12. An apparatus for dynamically determining the spatial orientation of a slider positioned above a transparent disk, the apparatus comprising:
    optical means for directing one or more incident beams of light to the interface between the slider and the transparent disk;
    measuring means for simultaneously measuring values of light properties of one or more beams of light reflected from said slider-disk interface, the simultaneously measured values respectively corresponding with multiple testing points on the surface of the slider which are spaced apart from each other; and
    calculating means for calculating the spatial orientation of the slider based on said simultaneously measured values.

13. An apparatus as claimed in claim 12, wherein said calculating means can use said values measured by said measuring means to derive an indication of the respective spacing between the surface of the transparent disk and each of said multiple testing points on said slider surface.

14. An apparatus as claimed in claim 12, wherein the number of said multiple testing points is equal to or greater than the number of degrees of freedom said slider has in its movement above the transparent disk, so that the spatial orientation of the slider can be fully determined.

15. An apparatus as claimed in claim 14, wherein said number of degrees of freedom and the number of said multiple values are both equal to three.

16. An apparatus as claimed in claim 12, wherein the calculation means is able to calculate the spatial position and orientation of the slider in terms of (i) a distance from the transparent disk surface, (ii) a pitch angle and (iii) a roll angle.

17. An apparatus as claimed in claim 12, wherein said optical means is able to provide one or more beams of light each have two or more discrete wavelengths, and said measuring means is able to measure values which include the relative intensities of two or more discrete wavelengths after reflection from the slider-disk interface.

18. An apparatus as claimed in claim 12, wherein said optical means is able to provide one or more beams of light have two orthogonal vectors of polarisation, and said measuring means is able to measure values which include the relative intensities of the two vectors of polarisation after reflection from the slider-disk interface.

19. An apparatus as claimed in claim 18, wherein said optical means is able to direct one or more beams of light to be incident on said slider-disk interface at an angle substantially between 0° and 80°.

20. An apparatus as claimed in claim 12, wherein said measurement means is able to simultaneously measure said multiple values by independently using more than one of said one or more beams of light reflected from said slider-disk interface.

21. An apparatus as claimed in claim 12, wherein the calculation means is able to determine the minimum flying height of the slider once the spatial orientation of the slider is determined and the surface geometry of the slider is known.

22. A method of dynamically determining the spatial position and orientation of a slider positioned above a transparent disk, the method comprising the steps of:
  directing one or more incident beams of light to the interface between the slider and the disk, wherein said one or more beams of light each have two or more wavelengths;
  simultaneously measuring values derived from one or more beams of light reflected from said slider-disk interface, said simultaneously measured values respectively corresponding with multiple testing points on the surface of the slider which are spaced apart from each other, said values include the relative intensities of said two or more wavelengths after reflection from the slider-disk interface, said values are simultaneously measured by using a series of cascaded mirrors having pinholes to isolate reflected light respectively corresponding with each of said multiple testing points from one beam of light reflected from the slider-disk interface; and
  calculating the spatial orientation of the slider based on said simultaneously measured values.

23. An apparatus for dynamically determining the spatial orientation of a slider positioned above a transparent disk, the apparatus comprising:
  optical means for directing one or more incident beams of light to the interface between the slider and the transparent disk, said optical means is able to provide one or more beams of light each have two or more discrete wavelengths;
  measuring means for simultaneously measuring values of light properties of one or more beams of light reflected from said slider-disk interface, the simultaneously measured values respectively corresponding with multiple testing points on the surface of the slider which are spaced apart from each other, said measuring means is able to measure values which include the relative intensities of two or more discrete wavelengths after reflection from the slider-disk interface, said measurement means is able to simultaneously measure said multiple values by using a series of cascaded mirrors having pinholes to isolate reflected light respectively corresponding with each of said multiple testing points from one beam of light reflected from the slider-disk interface; and
  calculating means for calculating the spatial orientation of the slider based on said simultaneously measured values.

* * * * *

UNITED STATES PATENT AND TRADEMARK OFFICE
CERTIFICATE OF CORRECTION

PATENT NO. : 6,847,459 B2  Page 1 of 1
DATED : January 25, 2005
INVENTOR(S) : Yaolong Zhu et al.

It is certified that error appears in the above-identified patent and that said Letters Patent is hereby corrected as shown below:

<u>Column 5,</u>
Line 2, replace "A is 436" with -- $\lambda$ is 436 --.
Line 19, replace "$S_4$" with -- $s_4$ --.
Line 49, add -- $x_a = x_b$ --.

<u>Column 6,</u>
Line 22, replace "fitting-methods." with -- fitting methods. --.

<u>Column 7,</u>
Lines 19-20, replace "that is not" with -- that it is not --.

Signed and Sealed this

Twenty-eighth Day of March, 2006

JON W. DUDAS
*Director of the United States Patent and Trademark Office*